(12) United States Patent
Kim

(10) Patent No.: US 9,361,505 B2
(45) Date of Patent: Jun. 7, 2016

(54) DISPLAY DEVICE AND METHOD OF CONTROLLING THEREFOR

(71) Applicant: LG ELECTRONICS INC., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/338,858

(22) Filed: Jul. 23, 2014

(65) Prior Publication Data

US 2015/0347811 A1 Dec. 3, 2015

(30) Foreign Application Priority Data

Jun. 2, 2014 (KR) ........................ 10-2014-0067042

(51) Int. Cl.
*G06K 9/00* (2006.01)
*G06F 21/82* (2013.01)
*G06F 3/0487* (2013.01)
*G06F 3/0488* (2013.01)
*G06F 3/0485* (2013.01)
*G06F 3/0484* (2013.01)

(52) U.S. Cl.
CPC .......... *G06K 9/00033* (2013.01); *G06F 3/0485* (2013.01); *G06F 3/0487* (2013.01); *G06F 3/0488* (2013.01); *G06F 3/04842* (2013.01); *G06F 21/82* (2013.01); *G06F 2203/0338* (2013.01)

(58) Field of Classification Search
USPC ......... 382/115, 116, 124, 209; 340/5.53, 5.83
See application file for complete search history.

(56) References Cited

U.S. PATENT DOCUMENTS 7,310,433 B2 * 12/2007 Umezaki et al. ............. 382/124
8,127,254 B2 * 2/2012 Lindberg ............ G06F 3/04817
715/863
8,311,514 B2 * 11/2012 Bandyopadhyay ... G06F 1/1643
455/410
8,333,321 B2 * 12/2012 Gressel et al. ................ 235/382
8,416,148 B1 * 4/2013 Park ................................ 345/1.1
8,443,199 B2 * 5/2013 Kim .................... G06F 3/03547
345/173
8,473,864 B2 * 6/2013 Segal et al. .................... 715/810
8,539,382 B2 * 9/2013 Lyon ..................... G06F 3/0488
455/411
8,610,574 B2 * 12/2013 Kestenbaum .............. 340/572.1
2005/0078855 A1 4/2005 Chandler et al.
2007/0273658 A1 11/2007 Yli-Nokari et al.
2012/0050158 A1 3/2012 Ahn
2013/0324089 A1 12/2013 Kim et al.
2014/0115694 A1 4/2014 Fadell et al.

FOREIGN PATENT DOCUMENTS

KR 10-2006-0131544 A 12/2006
WO WO 2010/062062 A2 6/2010
WO WO 2012/145453 A1 10/2012

* cited by examiner

*Primary Examiner* — Yosef Kassa
(74) *Attorney, Agent, or Firm* — Birch, Stewart, Kolasch & Birch, LLP

(57) ABSTRACT

A display device and a method of controlling therefor are disclosed. The display device includes a fingerprint recognition unit configured to recognize a fingerprint and a movement of the fingerprint, a touch display unit configured to display visual content and a controller configured to control the fingerprint recognition unit and the touch display unit, wherein if a fingerprint contacted with the fingerprint recognition unit is recognized as a registered fingerprint, the controller is configured to switch a screen to a home screen from a lock screen by unlocking the display device, wherein if a notification event is detected the controller is configured to control the touch display unit to display a notification list selection screen together with the switched home screen, and wherein if a continuous movement of the fingerprint maintaining the contact is recognized, the controller is configured to perform a control process on the notification list selection screen.

20 Claims, 21 Drawing Sheets

FIG. 7
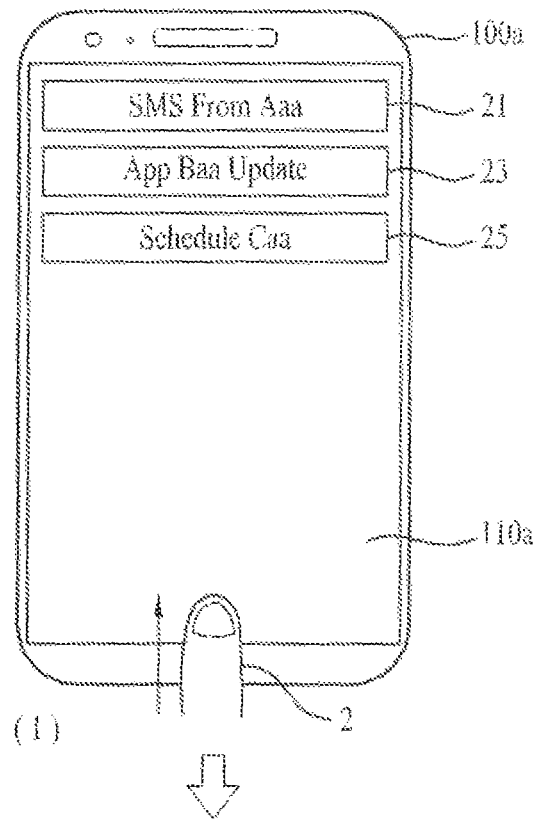
(1)
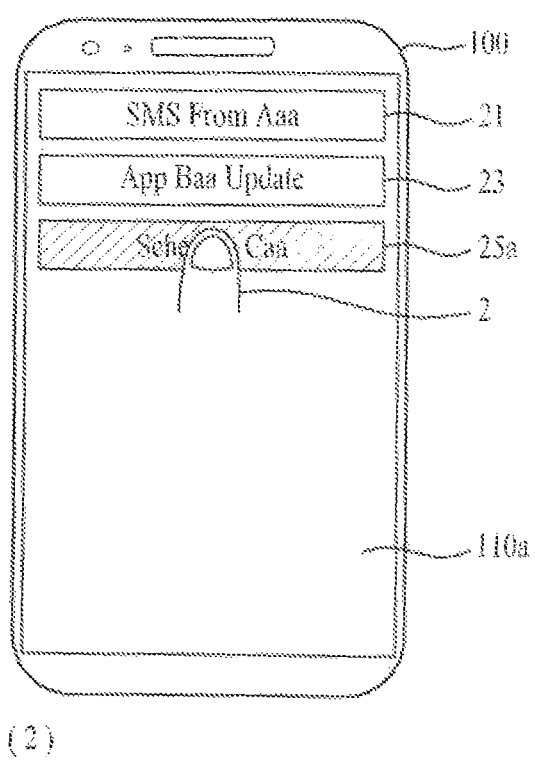
(2)

FIG. 8
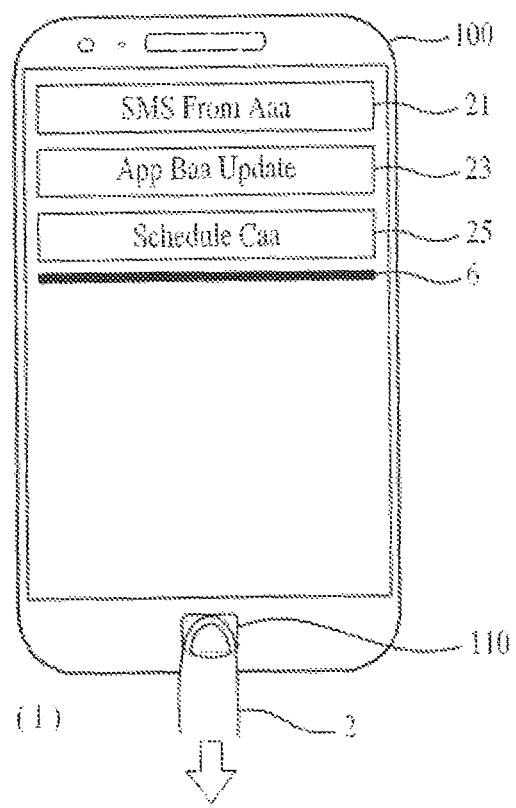
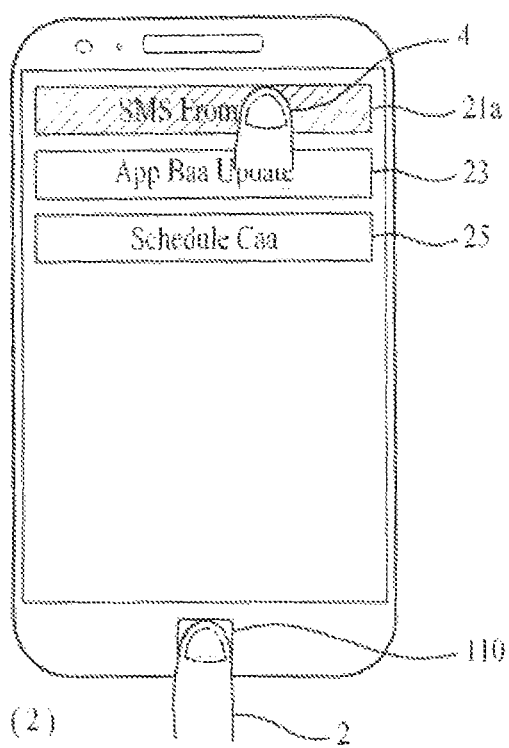

FIG. 9
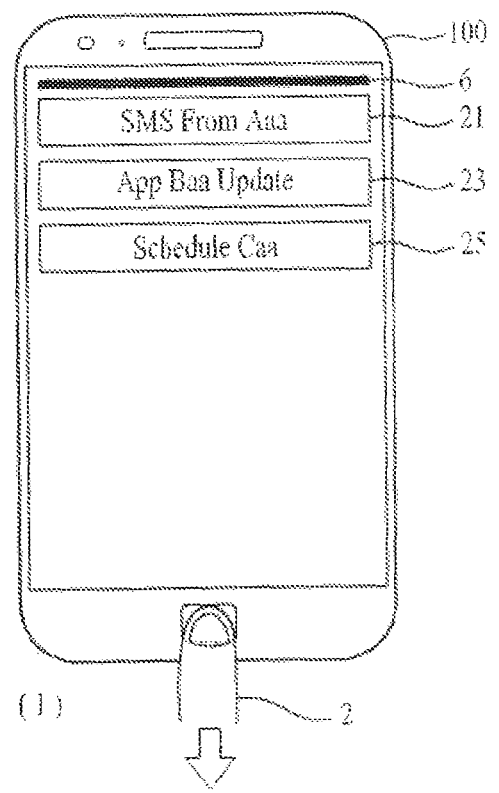
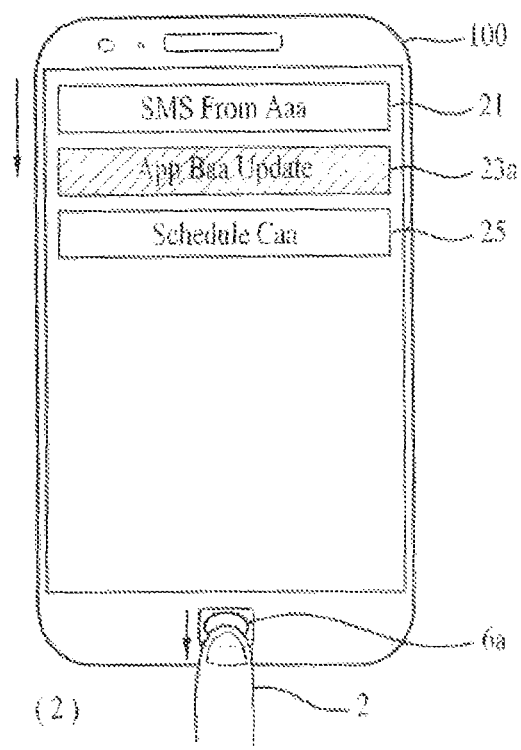

FIG. 10
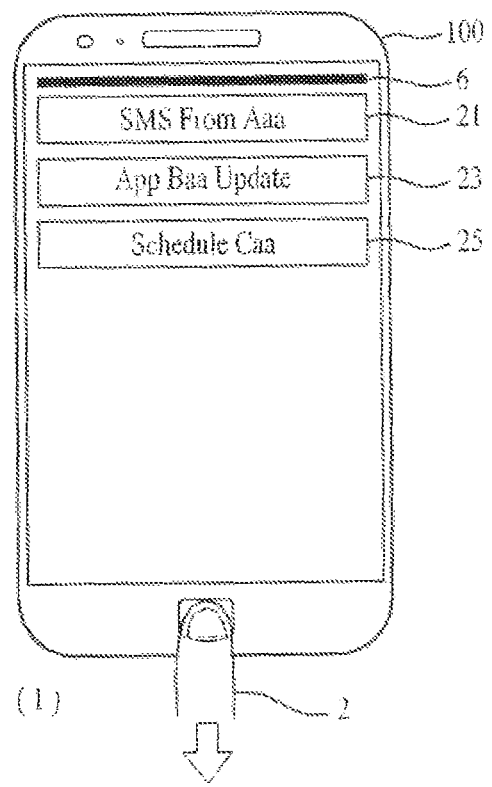
(1)
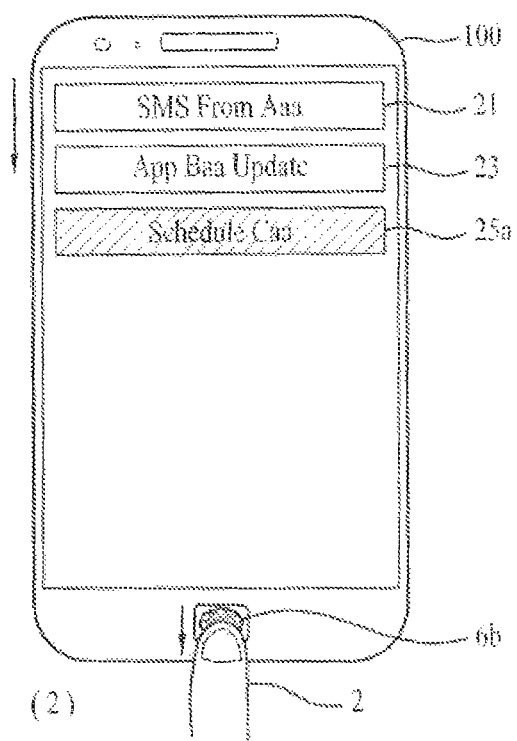
(2)

FIG. 11
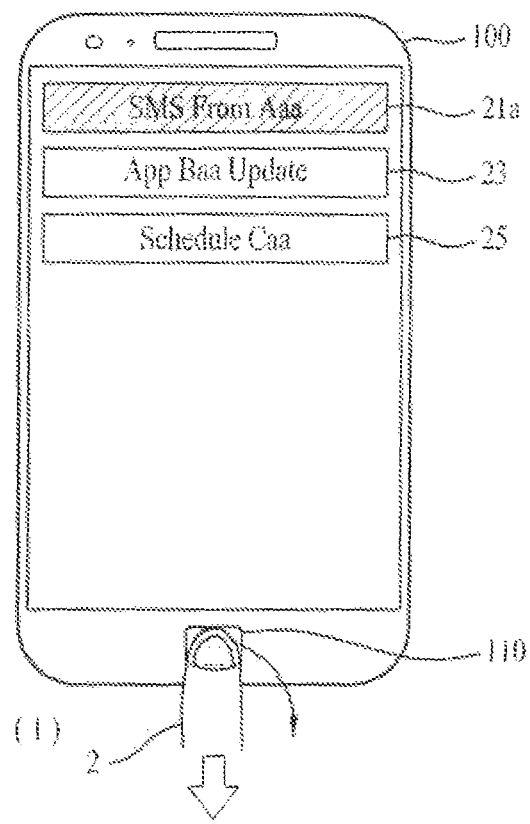
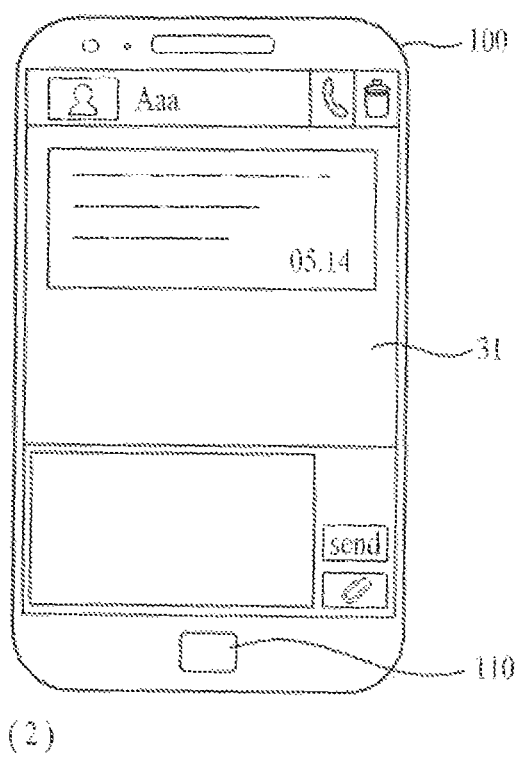

FIG. 12
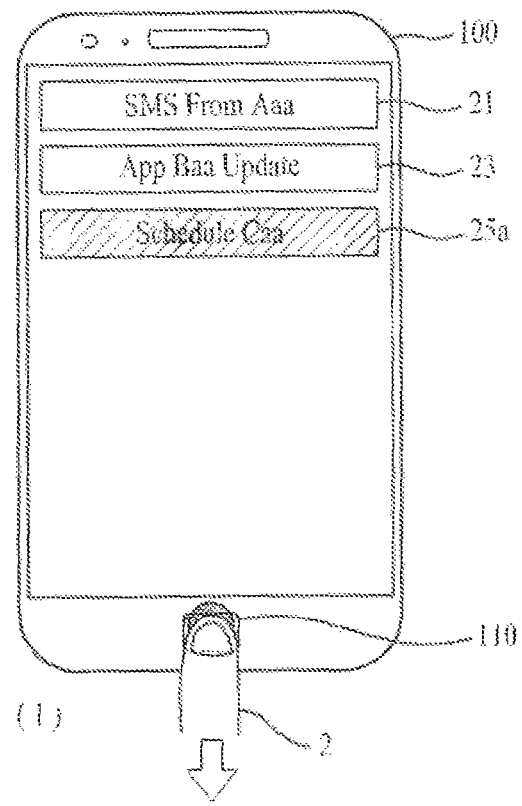
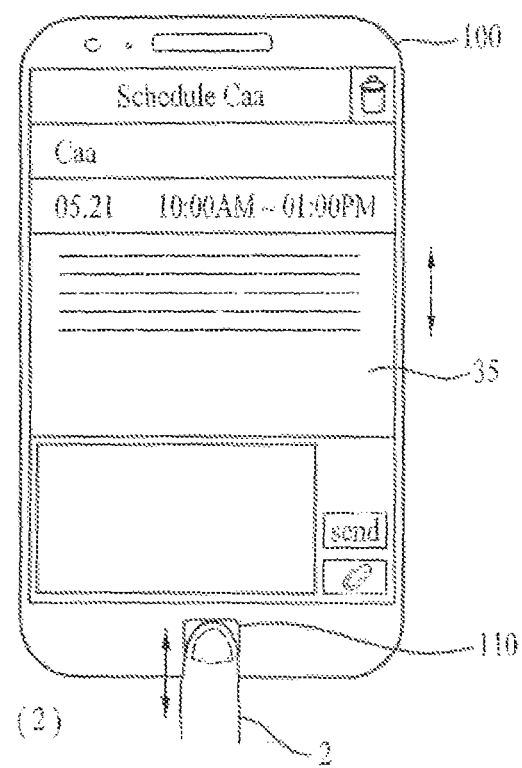

FIG. 13
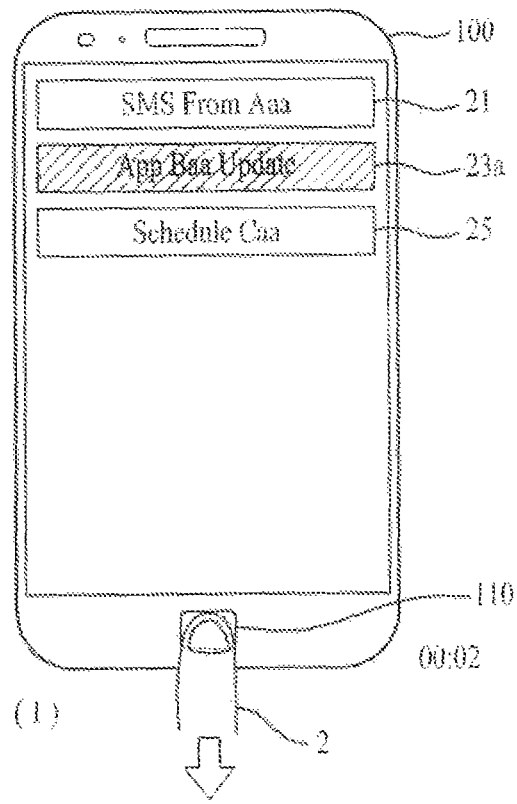
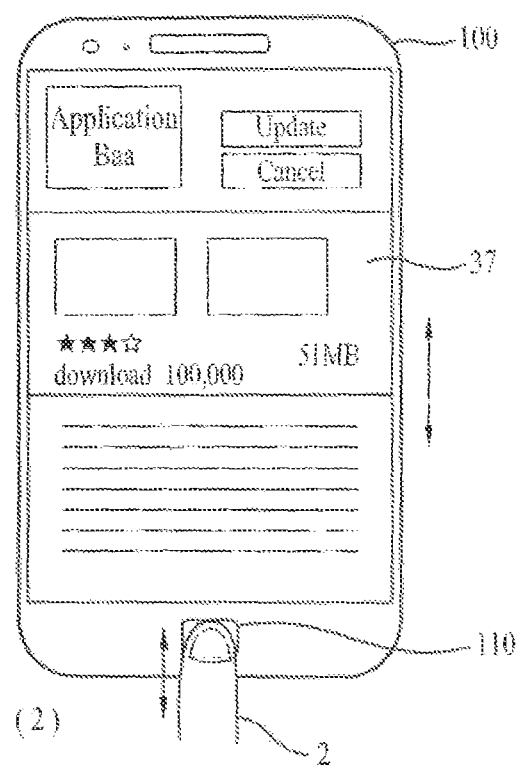

FIG. 14
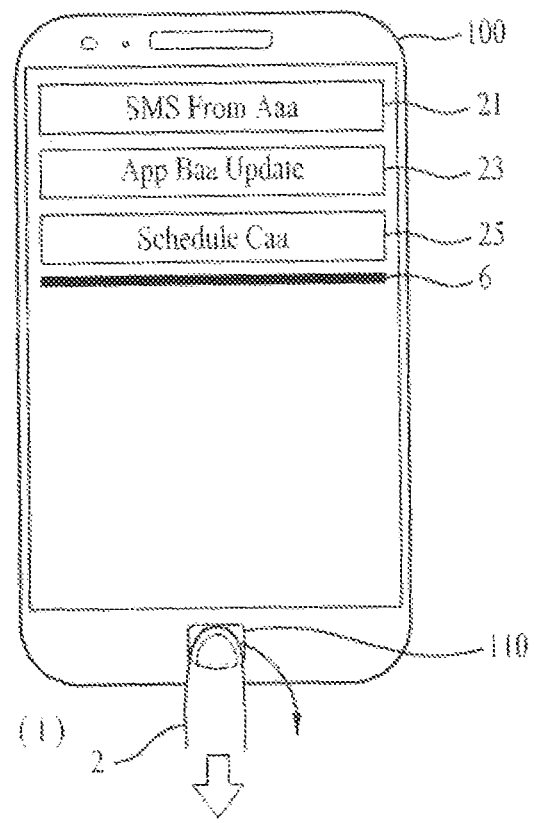
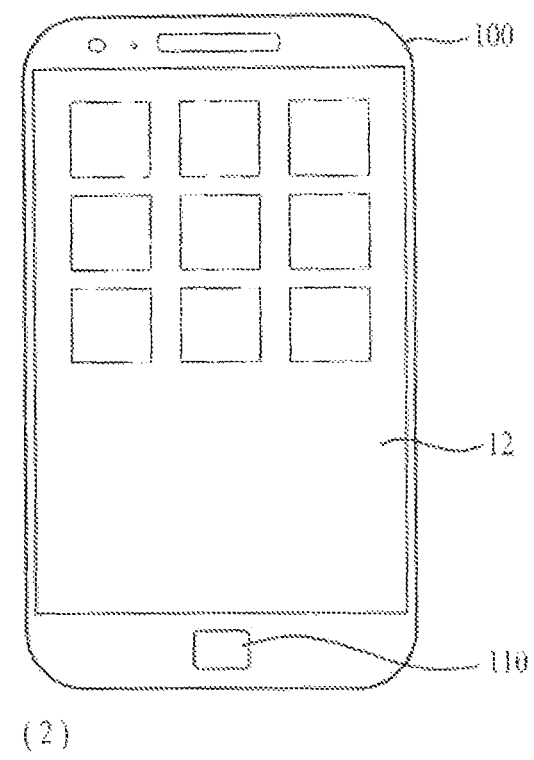

FIG. 15
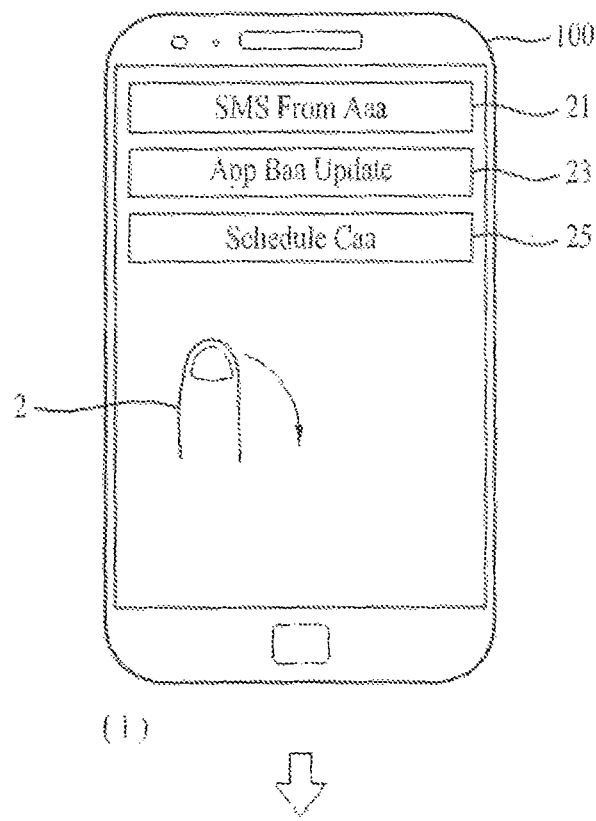
(1)
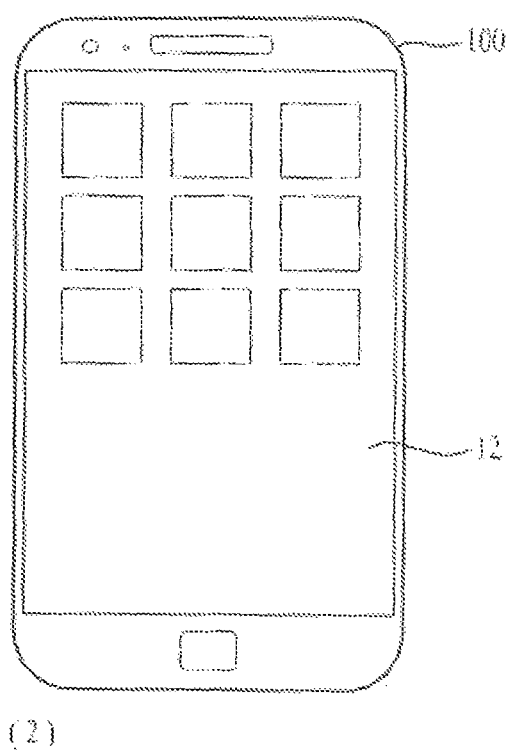
(2)

FIG. 18
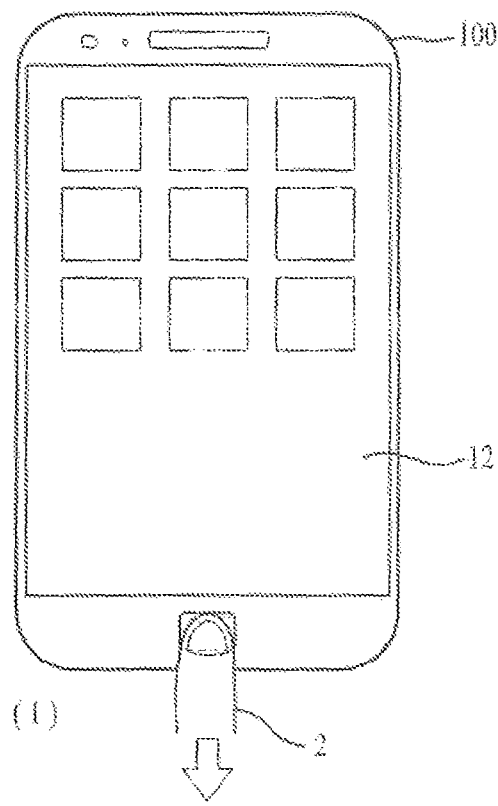
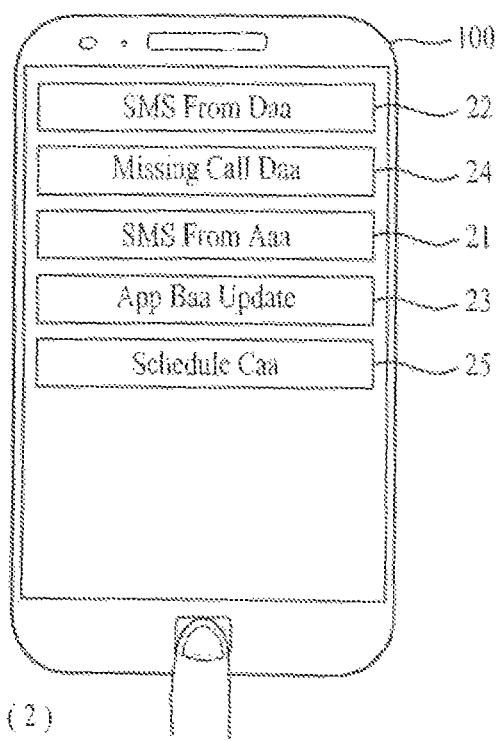

FIG. 19
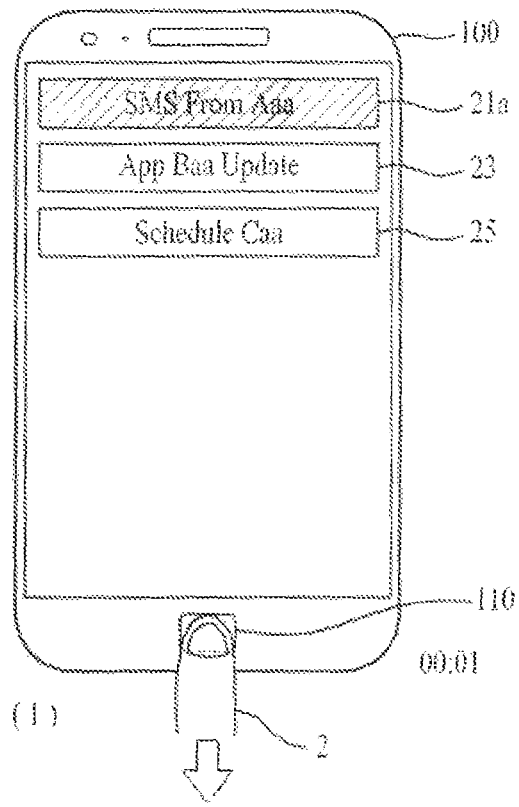
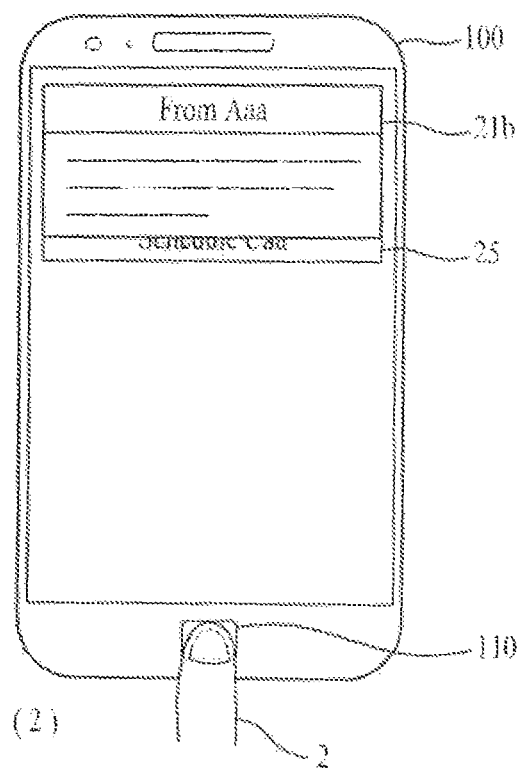

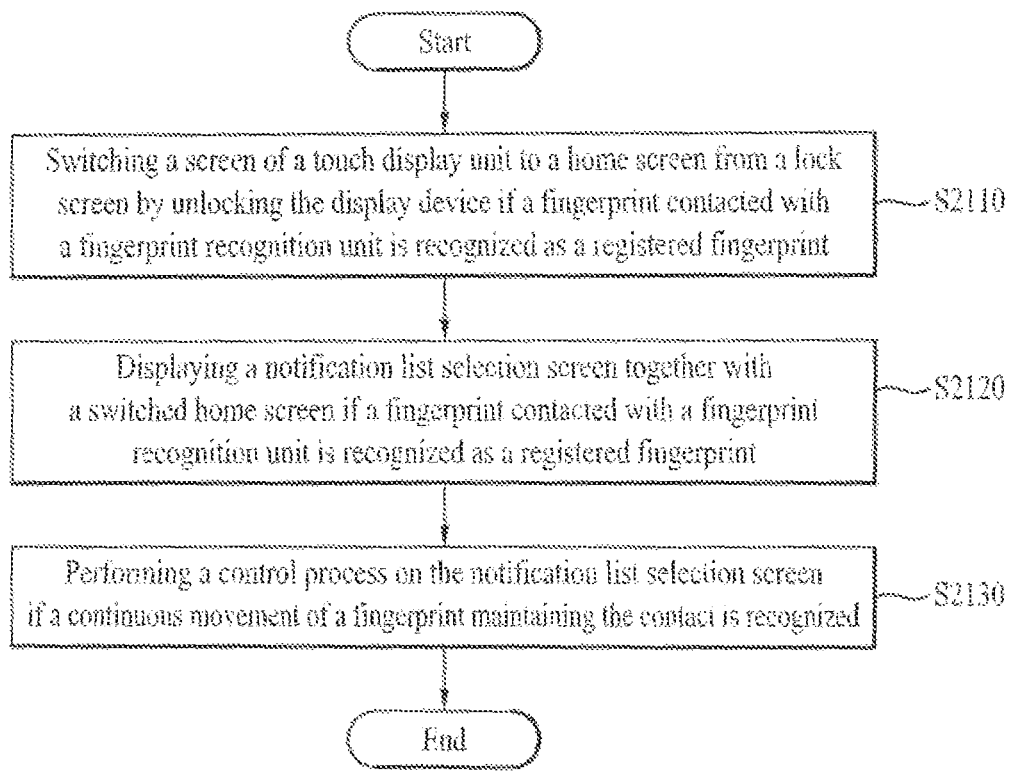

DISPLAY DEVICE AND METHOD OF CONTROLLING THEREFOR

This application claims the benefit of the Korean Patent Application No. 10-2014-0067042, filed on Jun. 2, 2014, which is hereby incorporated by reference as if fully set forth herein.

BACKGROUND OF THE INVENTION

1. Field of the Invention

The present specification relates to a display device and a method of controlling therefor.

2. Discussion of the Related Art

As electronic and communication technologies are developing, various devices have been developed. As a display device is miniaturized and popularized, the display device, which is used for a personal use, is growing. As the display device performs various functions and is used for a personal use, a user uses the display device in a manner of setting a lock function to the display device.

The display device also performs a necessary operation in a locked state. For instance, if a message is arrived from a counterpart, the display device receives the message. Or, the display device can output a notification message according to an alarm or a schedule configured by a user.

In order for the user to check the notification message and execute an application related to the notification message, the user may have inconvenience of performing lots of steps ranging from unlocking the display device to executing the application. Hence, there exists necessity for a method capable of performing the steps ranging from unlocking the display device to executing the application related to the notification at a time.

SUMMARY OF THE INVENTION

Accordingly, the present specification is directed to an apparatus and method thereof that substantially obviate one or more problems due to limitations and disadvantages of the related art. An object of the present specification is to provide a display device capable of performing unlock of a display device using a fingerprint and executing an application related to a notification in a continuous process and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a fingerprint recognition unit configured to recognize a fingerprint and a movement of the fingerprint, a touch display unit configured to display visual content and a controller configured to control the fingerprint recognition unit and the touch display unit, if a fingerprint contacted with the fingerprint recognition unit is recognized as a registered fingerprint, the controller is configured to switch a screen of the touch display unit to a home screen from a lock screen by unlocking the display device, if a notification event is detected when the fingerprint is contacted, the controller is configured to control the touch display unit to display a notification list selection screen together with the switched home screen, and if a continuous movement of the fingerprint maintaining the contact is recognized, the controller is configured to perform a control process on the notification list selection screen.

And, if the contact is maintained and moves, the control process can move a selection indicator according to a predetermined condition.

Meanwhile, the controller can change a moving speed of the selection indicator according to a pressure of the contacted fingerprint.

Meanwhile, if a predetermined operation is recognized when the selection indicator is placed on the notification list, the control process can execute an application related to the notification list.

And, the notification list selection screen is displayed on the home screen and is overlapped with the home screen, the notification list selection screen is activated and the home screen is inactivated.

And, if the contact of the fingerprint is released when a notification list is not selected, the controller controls the touch display unit to make the notification list selection screen to disappear and display the home screen and if a contact is recognized again, the controller can perform the control process on the home screen according to a movement of the contact which is recognized again.

And, the controller gradually inactivates the notification list selection screen for a predetermined first time and can gradually activate the home screen for the predetermined first time.

And, if a contact of a fingerprint is recognized via the fingerprint recognition unit before inactivation of the notification list selection screen is completed, the controller can control the touch display unit to display the notification list selection screen again.

And, if a contact of a fingerprint is recognized for more than a predetermined second time via the fingerprint recognition unit when the home screen is displayed, the controller controls the touch display unit to switch the home screen to the notification list selection screen and the switched notification list selection screen can include an updated notification list by priority.

And, if it is determined that a center point of the fingerprint is positioned under a center point of the fingerprint recognition unit when the display device is unlocked, the controller can place an initial position of the selection indicator at the undermost of an notification list and if it is determined that the center point of the fingerprint is positioned above the center point of the fingerprint recognition unit when the display device is unlocked, the controller is configured can place the initial position of the selection indicator at the uppermost of the notification list.

Meanwhile, the predetermined condition moving the selection indicator may correspond to a moving direction of the fingerprint or a contact position of the fingerprint.

Meanwhile, when the selection indicator moves according to the moving direction of the fingerprint, the controller, if the fingerprint moves upwards on the fingerprint recognition unit, moves the selection indicator to a notification list positioned at the top of the selection indicator. And, if the fingerprint moves downwards on the fingerprint recognition unit, the controller can move the selection indicator to a notification list positioned at the bottom of the selection indicator.

And, when the selection indicator moves according to the contact position of the fingerprint, if it is determined that a center point of the fingerprint is positioned above a center point of the fingerprint recognition unit, the controller can move the selection indicator to a notification list positioned at the top of the selection indicator. And, if it is determined that the center point of the fingerprint is positioned under the center point of the fingerprint recognition unit, the controller can move the selection indicator to a notification list positioned at the bottom of the selection indicator.

And, when the selection indicator moves according to the contact position of the fingerprint, if the fingerprint maintaining the contact moves to the touch display unit, the controller can move the selection indicator to a notification list corresponding to the position of the contact on the touch display unit.

If the contact is released in a position which is included in remaining area except for the notification list area on the touch display unit, the controller can control the touch display unit to display the home screen.

And, there exist a plurality of notification lists and the controller can move the selection indicator to the plurality of the notification lists sequentially.

Meanwhile, the predetermined operation may correspond to at least one of an operation of releasing the contact, an operation of putting a pressure greater than a predetermined pressure and an operation of maintaining the contact for more than a predetermined third time without any different input.

And, the controller can control the touch display unit to further display a home screen selection list in the notification list selection screen.

And, if the selection indicator is placed on a notification list, the controller can control the touch display unit to display summary information of the notification list.

To achieve these objects and other advantages and in accordance with the purpose of the invention, as embodied and broadly described herein, according to one embodiment, a method of controlling a display device includes the steps of switching a screen of a touch display unit to a home screen from a lock screen by unlocking the display device if a fingerprint contacted with a fingerprint recognition unit is recognized as a registered fingerprint, displaying a notification list selection screen together with the switched home screen if a fingerprint contacted with a fingerprint recognition unit is recognized as a registered fingerprint and performing a control process on the notification list selection screen if a continuous movement of the fingerprint maintaining the contact is recognized.

According to the aforementioned various embodiments, a display device and a method of controlling therefor can unlock the display device and execute an application related to a notification with a continuous operation.

And, a display device and a method of controlling therefor enable a user to easily check and select a notification list.

And, a display device and a method of controlling therefor enable a user to easily switch a screen between a home screen and a notification list selection screen.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for explaining a method of selecting a notification list according to a third embodiment;

FIG. 8 is a diagram for explaining a method of selecting a notification list according to a fourth embodiment;

FIG. 9 is a diagram for explaining one embodiment of controlling a scroll speed;

FIG. 10 is a diagram for explaining a different embodiment of controlling a scroll speed;

FIG. 11 is a diagram for explaining a method of executing a notification-related application according to a first embodiment;

FIG. 12 is a diagram for explaining a method of executing a notification-related application according to a second embodiment;

FIG. 13 is a diagram for explaining a method of executing a notification-related application according to a third embodiment;

FIG. 14 is a diagram for explaining a method of switching to a home screen according to one embodiment;

FIG. 15 is a diagram for explaining a method of switching to a home screen according to a different embodiment;

FIG. 18 is a diagram for explaining one embodiment of executing a notification list selection screen in a home screen;

FIG. 19 is a diagram for explaining one embodiment of displaying summary information of a selected notification list;

FIG. 21 is a flowchart for a method of controlling a display device according to one embodiment.

DETAILED DESCRIPTION OF THE INVENTION

Figure 1:
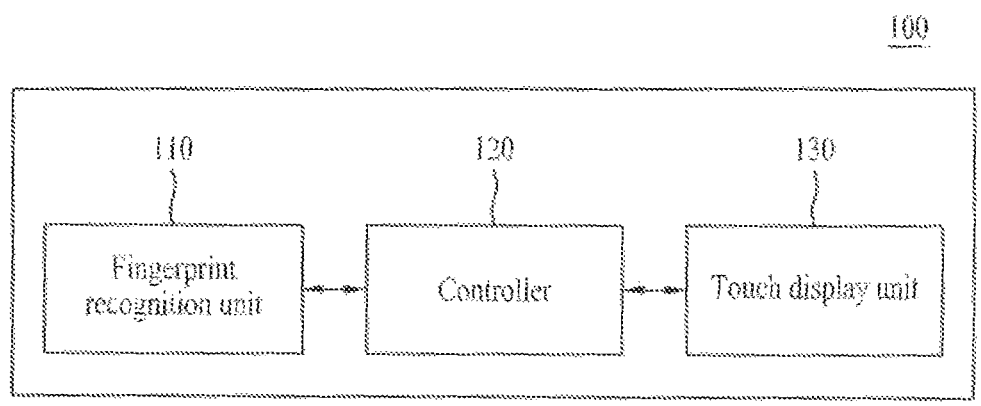
FIG. 1 is a block diagram for a display device according to one embodiment.

In the following description, preferred embodiments capable of concretely implementing the aforementioned object are explained with reference to attached drawings. In this case, composition and effect shown in the drawings and explained by the preferred embodiments are explained as at least one embodiment. A technical idea, a core composition and effect may be non-limited by the embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

FIG. 1 is a block diagram for a display device according to one embodiment.

Referring to FIG. 1, a display device 100 can include a fingerprint recognition unit 110, a controller 120 and a touch display unit 130.

The fingerprint recognition unit 110 can recognize a fingerprint and a movement of the fingerprint. The fingerprint recognition unit 110 can be implemented irrespective of the touch display unit 130 or can be implemented with the touch display unit 130 as one body. In case of implementing the fingerprint recognition unit 110 irrespective of the touch display unit 130, the fingerprint unit 110 can be arranged in the front or rear of the display device 100. In case of implementing the fingerprint recognition unit 110 and the touch display unit 130 as one body, the touch display unit 130 can be formed as one body in a manner of including a touch recognition layer configured to recognize a touch input and a fingerprint recognition layer configured to recognize a fingerprint. When the fingerprint recognition unit 110 and the touch display unit 130 are formed as one body, if a fingerprint of a user is contacted with the touch display unit 130, the touch recognition layer recognizes whether the fingerprint is touched and the fingerprint recognition layer can recognize fingerprint information.

The fingerprint recognition unit 110 can recognize a contacted fingerprint of a user. Or, the fingerprint recognition unit 110 can recognize the fingerprint of the user by an operation of swiping the fingerprint of the user in a prescribed direction. For instance, the prescribed direction may correspond to a top, a bottom, a left or a right direction.

And, the fingerprint recognition unit 110 can detect a pressure of a contacted fingerprint in a manner of including a pressure sensor in the fingerprint recognition unit.

The touch display unit 130 can display visual content. If a fingerprint contacted with the fingerprint recognition unit 110 is recognized as a registered fingerprint, the display device 100 is unlocked and the touch display unit 130 can display a screen in a manner of switching from a lock screen to a home screen according to a control of the controller 120. If a notification event is detected when the fingerprint is contacted, the touch display unit 130 can display a notification list selection screen together in a switched home screen. The notification list selection screen can be displayed in the home screen in a manner of being overlapped with the home screen. The notification list selection screen can be displayed in a manner of being activated and the home screen can be displayed in a manner of being inactivated.

In some cases, the touch display unit 130 can display the notification list selection screen only without displaying the home screen. And, if a predetermined command is inputted, the touch display unit 130 may display an application related to a selected notification list or switch to the home screen.

The controller 120 can control the fingerprint recognition unit 110 and the touch display unit 130. If a fingerprint contacted with the fingerprint recognition unit 110 is recognized as a registered fingerprint, the controller 120 unlocks the display device 100 and can switch a screen of the touch display unit 130 to a home screen from a lock screen.

When a fingerprint is contacted, if a notification event is detected, the controller 120 can control the touch display unit 130 to display a notification list selection screen in the switched home screen together. If a continuous movement of the fingerprint maintaining the contact is recognized, the controller 120 can perform a control process within the notification list selection screen.

If the contact of the fingerprint moves while maintaining contact, the control process can include a moving process of a selection indicator in a predetermined condition. For instance, the predetermined condition moving the selection indicator may correspond to a moving direction of the fingerprint or a contact position of the fingerprint.

And, when the selection indicator is positioned at a notification list, if a predetermined operation is recognized, the control process can include a process of executing an application related to the notification list. For instance, the predetermined operation may correspond to one operation selected from the group consisting of an operation of canceling a contact, an operation of putting a pressure greater than a predetermined pressure and an operation of maintaining a contact for more than a predetermined time without any different input.

In the following, various embodiments are explained.

Figure 2:
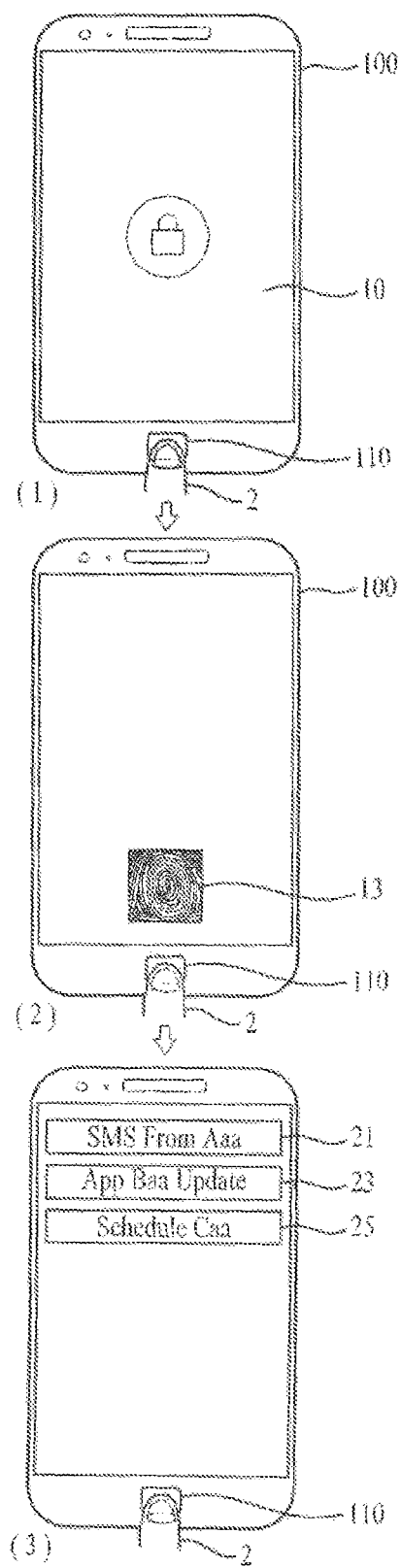
FIG. 2 is a diagram for explaining one embodiment of displaying an unlock screen and a notification list selection screen.

FIG. 2 is a diagram for explaining one embodiment of displaying an unlock screen and a notification list selection screen.

Referring to FIG. 2 (1), the display device 100 in a lock state is shown. The display device 100 can display a lock state screen 10. Although FIG. 2 (1) shows the display device 100) including the fingerprint recognition unit 110, which is arranged in the bottom of the touch display unit, the fingerprint recognition unit 110 can be arranged in a different position of the front face of the display device 100, Or, the fingerprint recognition unit 110 can be arranged in the rear face of the display device. In some cases, the fingerprint recognition unit 110 and the touch display unit can be implemented as one body. The fingerprint recognition unit 110) receives a fingerprint 2 input of a user.

Referring to FIG. 2 (2), the display device 100 receives a fingerprint input of a user.

The fingerprint recognition unit 110 can scan a contacted fingerprint 2 of a user. For instance, if the fingerprint of the user is contacted with the fingerprint recognition unit 110, the fingerprint recognition 110 can automatically scan the contacted fingerprint of the user. Or, if the contacted fingerprint 2 of the user is swiped to a prescribed direction, the fingerprint recognition unit 110 can scan the swiped fingerprint 2 of the user. The display device 100 can receive an input of fingerprint information of the user by the scan of the fingerprint recognition unit 110.

The display device 100 can compare the inputted fingerprint information of the user with fingerprint information of a registered user. The display device 100 can output a screen 13 related to the inputted fingerprint. For instance, the display device 100 can display an image of the inputted fingerprint. Or, the display device 100 can display such a message as 'fingerprint is scanning'.

If the inputted fingerprint information of the user is not matched with the fingerprint information of the registered user, the display device 100 maintains a lock state and can outputs a unlock failure message. If the inputted fingerprint information of the user is matched with the fingerprint information of the registered user, the display device 100 can cancel the lock state of the display device.

Referring to FIG. 2(3), the display device 100 displays a notification list selection screen.

If a fingerprint 2 contacted with the fingerprint recognition unit 110 is recognized as a registered fingerprint, the display device 100 unlocks the display device 100 and can switch a screen of the touch display unit to a home screen from a lock screen. Yet, when the fingerprint 2 is contacted, if a notification event is detected, the display device 100 can display the notification list selection screen on the switched home screen together. The home screen, which is displayed together with the notification list selection screen, can be displayed in a state of including transparency in a manner of being activated. For instance, the transparency can be configured by a value between 0% and 100%. In some cases, the display device 100 can display the notification list selection screen only without displaying the home screen.

The notification list selection screen can display notification lists 21/23/25 according to a notification event occurrence order in a manner that a recently occurred notification event is displayed first. Until the notification list selection screen is displayed from a point on which the lock state of the display device 100 is cancelled, the contact of the fingerprint 2 should be maintained.

Figure 3:
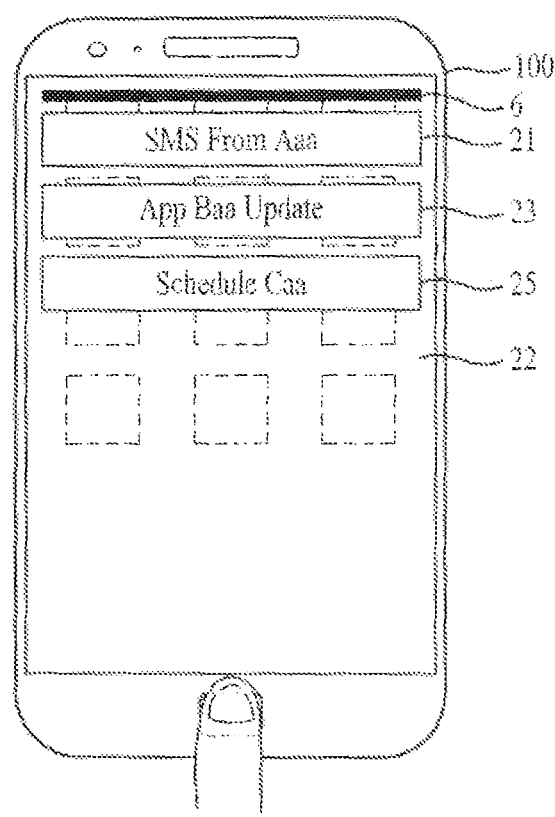
FIG. 3 is a diagram for explaining one embodiment of a notification list selection screen.

FIG. 3 is a diagram for explaining one embodiment of a notification list selection screen.

FIG. 3 shows a screen 22 in which a notification list selection screen and a home screen are displayed together. As mentioned in the foregoing description, the notification list selection screen can be displayed together with the home screen. The notification list selection screen can be displayed on the top of the home screen in a manner of being overlapped with each other. The notification list selection screen is activated and the home screen may be inactivated. In particular, the notification list selection screen may include at least one notification list 21/23/25. The notification list selection screen can be displayed in a manner of being activated. Hence, all control operations can be performed on the notification list selection screen.

The notification list selection screen can display a selection indicator 6. The selection indicator 6 means an identifier capable of identifying a currently selected notification list. The selection indicator 6 can move according to a position of a contacted fingerprint or a moving direction of the contacted fingerprint. An initial position of the selection indicator 6 can be determined according to a position of a fingerprint contacted with the fingerprint recognition unit.

The home screen can be displayed at the bottom of the notification list selection screen. For instance, the display device 100 configures a screen with a plurality of layers, displays the notification list selection screen in a upper layer and can display the home screen in a bottom layer.

The home screen can be inactivated. For instance, the home screen can be displayed with transparency. The transparency can be configured by 0% of transparency corresponding to a state identical to the notification list selection screen or 100% of transparency unable to check by the naked eye.

Figure 4:
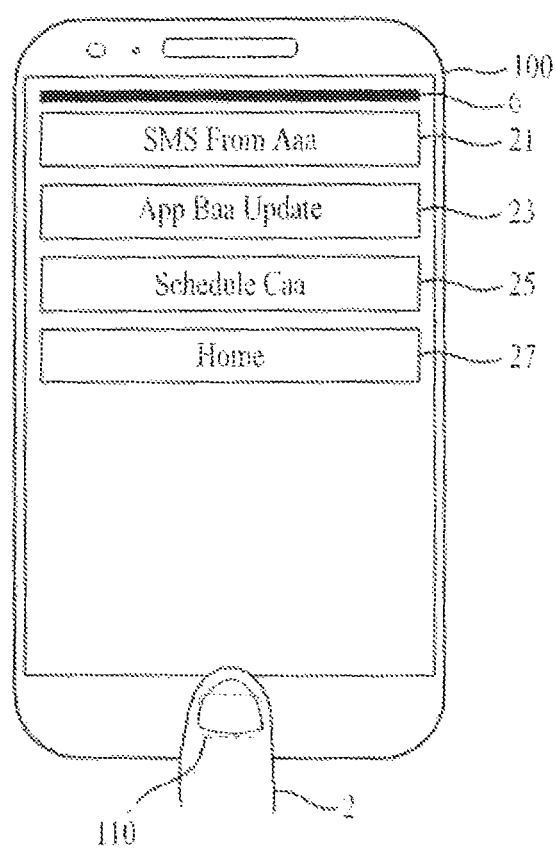
FIG. 4 is a diagram for explaining one embodiment of displaying a selection indicator in a notification list selection screen.

FIG. 4 is a diagram for explaining one embodiment of displaying a selection indicator in a notification list selection screen.

FIG. 4 shows a notification selection display screen. The notification selection display screen can display at least one notification list 21/23/25/27. And, the notification selection display screen can further display a home screen selection item 27. If the home screen selection item is selected and executed, the display device can switch the notification selection display screen to a home screen.

The notification selection display screen can display a selection indicator 6. An initial selection indicator 6 can be displayed at the undermost or the uppermost of the notification list. An initial position of the selection indicator 6 can be determined according to a position of a fingerprint contacted with the fingerprint recognition unit 110. For instance, when the display device 100 is unlocked, if a center point of the contacted fingerprint 6 is positioned below a center point of the fingerprint recognition unit on the basis of the center point of the fingerprint recognition unit 110, the initial position of the selection indicator may correspond to the undermost of the notification list. If the center point of the contacted fingerprint 6 is positioned above the center point of the fingerprint recognition unit, the initial position of the selection indicator 6 may correspond to the uppermost of the notification list.

If the initial selection indicator is displayed according to the position of the contacted fingerprint on the basis of the fingerprint recognition unit 110, since a user can have a wide area of the fingerprint recognition unit capable of moving a fingerprint, the user can easily move the selection indicator.

Referring to FIG. 4, since the center point of the contacted fingerprint 2 is positioned above the center point of the fingerprint recognition unit 110 on the basis of the center point of the fingerprint recognition unit, the selection indicator 6 can be displayed in the uppermost of the notification list. In the following description, embodiment of selecting a notification list by moving the selection indicator 6 is explained.

Figure 5:
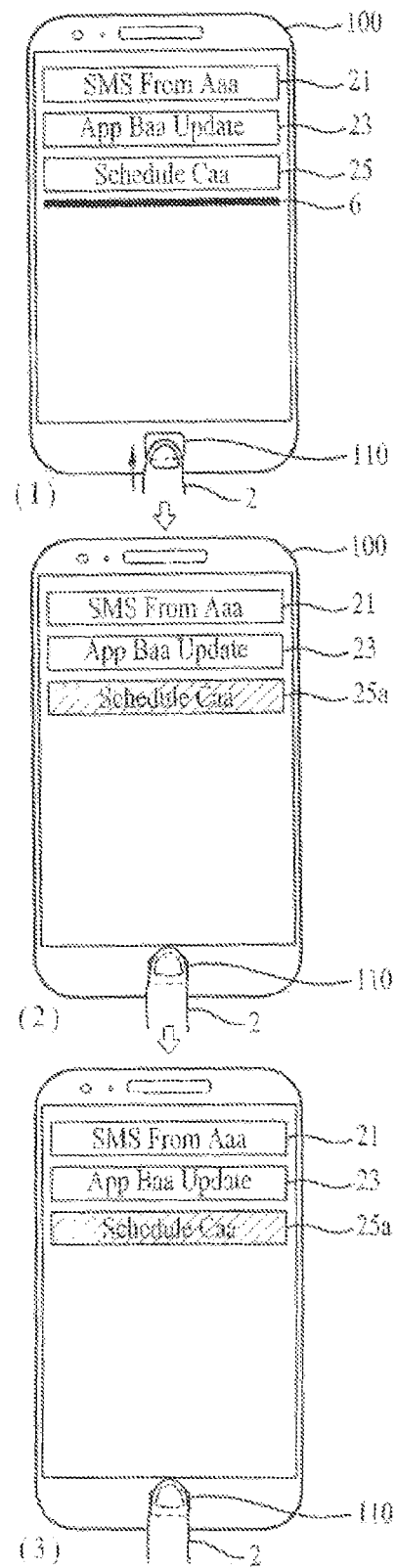
FIG. 5 is a diagram for explaining a method of selecting a notification list according to a first embodiment.

FIG. 5 is a diagram for explaining a method of selecting a notification list according to a first embodiment.

Referring to FIG. 5 (1), it shows a notification list selection screen. The notification list selection screen can display at least one notification list 21/23/25 where an event has occurred. Since a center point of a contacted fingerprint 2 is positioned at below of a center point of the fingerprint recognition unit 110 on the basis of the center point of the fingerprint recognition unit the display device 100 can place a selection indicator 6 in the undermost of the notification list. The fingerprint recognition unit 110 can detect a movement of the fingerprint 2, which moves upwards while a contact state is maintained.

FIG. 5 (2) shows the notification list selection screen to which the selection indicator has moved according to a movement of the contacted fingerprint 2. If the fingerprint 2 moves while a contact is maintained, the display device 100 can move the selection indicator 6 according to a moving direction of the fingerprint. In particular, if the fingerprint 2 maintaining the contact moves upwards on the fingerprint recognition unit 110, the display device 100 can move the selection indicator to a notification list 25a positioned at the top of the selection indicator. Similarly, if the fingerprint maintaining the contact moves downwards on the fingerprint recognition unit, the display device can move the selection indicator to a notification list positioned at the bottom of the selection indicator.

The display device 100 can display the notification list 25a to which the selection indicator has moved in a manner of being differentiated from other notification list 21/23. For instance, the notification list 25a to which the selection indicator has moved can be displayed by a different color, displayed in a manner of reversing light and shade or displayed by a thick line.

The contacted fingerprint 2 moves to the top of the fingerprint recognition unit 110 and may stop at a moved position.

Referring to FIG. 5 (3), a selection indicator is positioned at one notification list.

In FIG. 5, the selection indicator can move according to a moving direction of a fingerprint. If a movement of the fingerprint contacted with the fingerprint recognition unit 110 is not recognized, the display device 100 may not move the selection indicator. Hence, referring to FIG. 5 (3), since the fingerprint contacted with the fingerprint recognition unit 110 does not move, the selection indicator may not move as well.

Meanwhile, the selection indicator may move according to a position with which a fingerprint is contacted.

Figure 6:
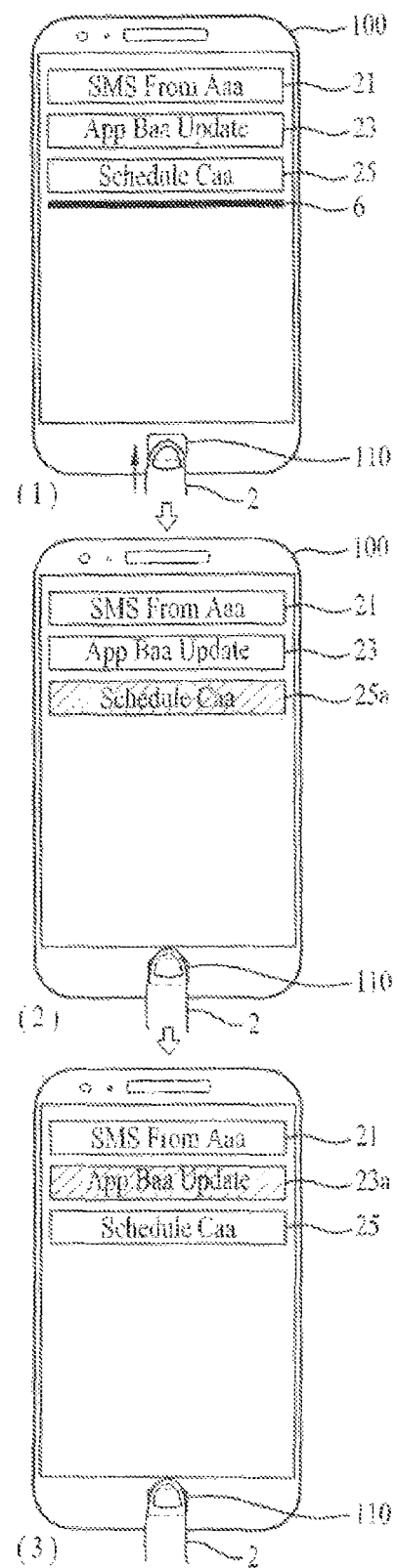
FIG. 6 is a diagram for explaining a method of selecting a notification list according to a second embodiment.

FIG. 6 is a diagram for explaining a method of selecting a notification list according to a second embodiment.

Referring to FIG. 6 (1), it shows a notification list selection screen. The notification list selection screen can display at least one notification list 21/23/25 where an event has occurred. And, the notification list selection screen can display a selection indicator 6. Since a center point of a contacted fingerprint 2 is positioned below a center point of the fingerprint recognition unit 110 on the basis of the center point of the fingerprint recognition unit, the display device 100 can place the selection indicator 6 in the undermost of the notification list. The fingerprint recognition unit 110 can detect a movement of the fingerprint 2, which moves upwards while maintaining a contact state.

FIG. 6 (2) shows the notification list selection screen to which the selection indicator has moved. If the fingerprint 2 moves while a contact is maintained, the display device 100 can move the selection indicator 6 according to a contact position of the fingerprint. In particular, if the fingerprint 2 maintaining the contact moves on the fingerprint recognition unit 110 and a center point of the fingerprint 2 is positioned above a center point of the fingerprint recognition unit 110, the display device 100 can move the selection indicator to a notification list positioned at the top of the selection indicator. Similarly, if the fingerprint 2 maintaining the contact moves on the fingerprint recognition unit 110 and the center point of the fingerprint 2 is positioned below the center point of the fingerprint recognition unit 110, the display device can move the selection indicator to a notification list positioned at the bottom of the selection indicator. The display device 100 can display the notification list 25a to which the selection indicator has moved in a manner of being differentiated from other notification list 21/23.

The contacted fingerprint 2 moves to the top of the fingerprint recognition unit 110 and may stop at a moved position.

Referring to FIG. 6 (3), a selection indicator has moved again.

In FIG. 6, the selection indicator can move according to a contact position of a fingerprint. The display device 100 can move the selection indicator according to a position of the fingerprint contacted with the fingerprint recognition unit 110. Hence, since the contacted fingerprint 2 is positioned at an upper part of the fingerprint recognition unit 110, the display device 100 can move the selection indicator to one block upward again. Hence, a notification list 23a to which the selection indicator has moved may change.

There may exist a single or a plurality of notification lists. If there is one notification list, the display device 100 may not move a selection indicator positioned at the notification list. Yet, if there exist a plurality of notification lists, the display device 100 may sequentially move the selection indicator to each of a plurality of the notification lists.

FIG. 7 is a diagram for explaining a method of selecting a notification list according to a third embodiment.

Referring to FIG. 7 (1), a contacted fingerprint moves on the touch display unit. A notification list selection screen can display at least one notification list 21/23/25 where an event has occurred.

A display device 100a can be implemented in a manner that a fingerprint recognition unit 110a and a touch display unit are integrated into one body. In particular, the touch display unit includes a fingerprint recognition layer and a touch recognition layer. The fingerprint recognition layer recognizes a contacted fingerprint and the touch recognition layer can recognize a touch input.

The display device 100a can move a selection indicator according to a contact position of a fingerprint 2. Yet, if the selection indicator moves in a manner that the touch display unit is directly contacted, the display device 100a may not display the selection indicator since a user can easily recognize the contact position.

Referring to FIG. 7 (2), a notification list is selected.

If a fingerprint maintaining a contact moves on the touch display unit, the display device 100a can recognize a contact state and a position of the fingerprint 2. If the contact of the fingerprint is placed at a position of a notification list of the notification list selection screen, a selection indicator can be moved to a notification list 25a corresponding to the position of the contact.

Although the display device 100a in which the touch display unit and the fingerprint recognition unit are formed together as one body is explained in FIG. 7 as one embodiment, a similar operation can also be performed in a display device where the fingerprint recognition unit is separately formed. In particular, a contacted fingerprint can move to the touch display unit from the fingerprint recognition unit while maintaining the contacted state. If the contacted fingerprint moves on the touch display unit and is positioned on a notification list, the display device can move a selection indicator to the notification list corresponding to the contacted fingerprint. The display device can move the selection indicator in a manner of recognizing a touch instead of a fingerprint for the contacted fingerprint that moves on the touch display unit.

FIG. 8 is a diagram for explaining a method of selecting a notification list according to a fourth embodiment.

FIG. 8 (1) shows a notification list selection screen. The notification list selection screen can display at least one notification list 21/23/25 where an event has occurred. And, the notification list selection screen can display a selection indicator 6. A contacted fingerprint 2 is maintaining a contacted state.

Referring to FIG. 8 (2), a notification list is selected.

While a contact of a fingerprint 2 is maintained on the fingerprint recognition unit 110, if a second contact different from the fingerprint 2 on the fingerprint recognition unit 110 is contacted with a notification list on the notification list selection screen, the display device 100 can move a selection indicator to the contacted notification list 21a.

The display device can control a moving speed of the selection indicator while moving the selection indicator.

FIG. 9 is a diagram for explaining one embodiment of controlling a scroll speed.

FIG. 9 (1) shows a notification list selection screen. The notification list selection screen can display at least one notification list 21/23/25 where an event has occurred. And, the notification list selection screen can display a selection indicator 6. A contacted fingerprint 2 is maintaining a contacted state.

Referring to FIG. 9 (2), a diagram for explaining a method of determining a moving speed of a selection indicator according to a pressure of a contacted fingerprint is shown. The fingerprint recognition unit 110 can detect a pressure of a contacted fingerprint 2. For instance, the fingerprint recognition unit 110 can detect a pressure in a manner of including a pressure sensor.

The fingerprint recognition unit 110 can detect a fingerprint 2 on which a pressure less than a predetermined pressure is put is moving downwards. FIG. 9 (2) shows a press state 6a on which the pressure less than the predetermined pressure is put. The display device 100 moves a selection indicator according to the pressure of the contacted fingerprint 2. For instance, if the fingerprint 2 is moved in a manner of being put with the pressure less than the predetermined pressure, the display device 100 can move the selection indicator with a speed identical to a moving speed of the fingerprint 2. FIG. 9 (2) shows a state that the selection indicator has moved to a second notification list 23a according to a movement of the fingerprint 2.

If the fingerprint recognition unit 110 is pressed by a pressure greater than the predetermined pressure, the display device 100 can move the selection indicator in a manner of changing the moving speed of the selection indicator.

FIG. 10 is a diagram for explaining a different embodiment of controlling a scroll speed.

FIG. 10 (1) shows a notification list selection screen. The notification list selection screen can display at least one notification list 21/23/25 where an event has occurred. And, the notification list selection screen can display a selection indicator 6. A contacted fingerprint 2 is maintaining a contacted state.

Referring to FIG. 10 (2), a diagram for explaining a method of determining a moving speed of a selection indicator according to a pressure of a contacted fingerprint is shown. The fingerprint recognition unit 110 can detect a pressure of a contacted fingerprint 2. The fingerprint recognition unit 110 can detect a fingerprint 2 on which a pressure greater than a predetermined pressure is put is moving downwards. FIG. 10 (2) shows a press state 6b on which the pressure greater than the predetermined pressure is put. The display device 100 moves a selection indicator according to the pressure of the contacted fingerprint 2. For instance, if the fingerprint 2 is moved in a manner of being put with the pressure greater than the predetermined pressure, the display device 100 can move the selection indicator with a speed faster than a moving speed of the fingerprint 2.

Referring to FIG. 10 (2), a moving speed or a moving distance of the fingerprint 2 is identical to the moving speed or the moving distance of the fingerprint 2 depicted in FIG. 9 (2). Referring to FIG. 9 (2), the selection indicator has moved to a second notification list 23a according to a movement of the fingerprint 2. On the contrary, referring to FIG. 10 (2), the selection indicator has moved to a third notification list 25a according to the movement of the fingerprint 2. In particular, the display device 100 can change the moving speed of the selection indicator according to the pressure of the contacted fingerprint.

The display device can move a selection indicator to a notification list on a notification list selection screen according to a movement of a contacted fingerprint. If s predetermined operation is recognized, the display device can execute an application related to the notification list at which the selection indicator is positioned.

FIG. 11 is a diagram for explaining a method of executing a notification-related application according to a first embodiment.

Referring to FIG. 11 (1), a notification list selection screen is depicted. The notification list selection screen can display at least one notification list where an event has occurred. A selection indicator can be positioned at one notification list 21a in a manner of moving to the notification list according to a movement of a contacted fingerprint 2. An SMS notification list 21a is selected in a manner that the selection indicator is moved.

When a selection indicator is positioned at a notification list, if a predetermined operation is recognized, the display device 100 can execute an application related to the notification list. In FIG. 11, the predetermined operation corresponds to an operation of cancelling a contact. The fingerprint recognition unit 110 can recognize that a contact of a fingerprint 2 is cancelled.

Referring to FIG. 11 (2), an execution screen of an application is depicted. As mentioned in the foregoing description, when a notification list is selected, if it is recognized that a contact is cancelled, the display device 100 can execute an application related to the selected notification list. In FIG. 11 (1), since the selected notification list corresponds to the SMS notification list, the display device can execute an SMS application 31. In particular, the display device can display the SMS application 31 including sender information of a received SMS, a message, a reply-related control menu and the like.

The notification list can be sequentially arranged in a descending order from a recently occurred notification event item. An application screen depicted in FIG. 11 is just an example.

FIG. 12 is a diagram for explaining a method of executing a notification-related application according to a second embodiment.

Referring to FIG. 12 (1), a notification list selection screen is depicted. The notification list selection screen can display at least one notification list where an event has occurred. A selection indicator can be positioned at one notification list 25a in a manner of moving to the notification list according to a movement of a contacted fingerprint 2. A schedule notification list 25a is selected in a manner that the selection indicator is moved.

When a selection indicator is positioned at a notification list, if a predetermined operation is recognized, the display device 100 can execute an application related to the notification list. In FIG. 12, the predetermined operation corresponds to an operation of putting a pressure greater than a predetermined pressure. The fingerprint recognition unit 110 can recognize that the pressure greater than the predetermined pressure is putting on the contacted fingerprint 2.

Referring to FIG. 12 (2), an execution screen of an application is depicted. As mentioned in the foregoing description, when a notification list is selected, if the fingerprint recognition unit 110 is pressed by the pressure greater than the predetermined pressure, the display device 100 can execute an application related to the selected notification list. In FIG. 12 (1), since the selected notification list corresponds to the schedule notification list, the display device can execute a schedule application 35. In particular, the display device can display the schedule application 35 including information on a schedule configured in advance.

The display device 100 executes a notification list-related application by recognizing an operation of pressing pressed by a pressure greater than the predetermined pressure. The fingerprint 2 contacted with the fingerprint recognition unit 110 can also be maintained when the application is executed. Hence, when the application is executed, the display device 100 can scroll a screen in which the application is displayed according to a movement of the fingerprint 2 that maintains the contact.

The notification list can be sequentially arranged in a descending order from a recently occurred notification event item. An application screen depicted in FIG. 12 is just an example.

FIG. 13 is a diagram for explaining a method of executing a notification-related application according to a third embodiment.

Referring to FIG. 13 (1), a notification list selection screen is depicted. The notification list selection screen can display at least one notification list where an event has occurred. A selection indicator can be positioned at one notification list 23a in a manner of moving to the notification list according to a movement of a contacted fingerprint 2. An application update notification list 23a is selected in a manner that the selection indicator is moved.

When a selection indicator is positioned at a notification list, if a predetermined operation is recognized, the display device 100 can execute an application related to the notification list. In FIG. 13, the predetermined operation corresponds to an operation of maintaining a contact for more than a predetermined time without any different input. The display device 100 can recognize that the contact of the fingerprint 2 is maintained for more than the predetermined time without any different input. For instance, the predetermined time may be configured by 2 seconds.

Referring to FIG. 13 (2), an execution screen of an application is depicted. As mentioned in the foregoing description, when a notification list is selected, if the contact of the fingerprint 2 is maintained for more than the predetermined time without any different input, the display device 100 can execute an application related to the selected notification list. In FIG. 13 (1), since the selected notification list corresponds to the application update notification list, the display device can execute an update application 37. In particular, the display device can display the update application 37 capable of updating the application.

The display device 100 executes a notification list-related application by recognizing the state that the contact is maintained for more than the predetermined time without any different input. The fingerprint 2 contacted with the fingerprint recognition unit 110 can also be maintained when the application is executed. Hence, when the application is executed, the display device 100 can scroll a screen in which the application is displayed according to a movement of the fingerprint 2 that maintains the contact.

The notification list can be sequentially arranged in a descending order from a recently occurred notification event item. An application screen depicted in FIG. 13 is just an example.

FIG. 14 is a diagram for explaining a method of switching to a home screen according to one embodiment.

Referring to FIG. 14 (1), a notification list selection screen is depicted. The notification list selection screen can display at least one notification list 21/23/25 where an event has occurred. When the display device 100 is unlocked, if a contacted fingerprint 2 is positioned at a lower position of the fingerprint recognition unit 110, a selection indicator 6 can be positioned at the undermost of the notification list. When the selection indicator 6 is not positioned on the notification list, the contact of the fingerprint can be cancelled.

Referring to FIG. 14 (2), a home screen 12 is depicted. When no notification list is selected, if a contact of a fingerprint is cancelled, the display device 100 can switch a notification list selection screen to the home screen 12. In particular, the notification list selection screen is disappeared from the touch display unit and the home screen can be displayed instead. When the home screen is displayed, if the display device 100 recognizes a contact of a fingerprint again, the display device can perform a control process within the home screen according to a movement of the recognized contact. For instance, if the contact moves while maintaining the contact, the control process may correspond to moving a selection indicator between icons within the home screen. If an icon is selected and an execution command is inputted, an application interconnected with the icon can be executed. The home screen is just an example. Any screen configured by a user as a first page can be a home screen. And, if the display device 100 is locked in the middle of executing an application, a screen of the executing application can be displayed instead of the home screen.

FIG. 15 is a diagram for explaining a method of switching to a home screen according to a different embodiment.

Referring to FIG. 15 (1), a notification list selection screen is depicted. The notification list selection screen can display at least one notification list 21/23/25 where an event has occurred. The display device 100a can move a selection indicator to a contact position of a fingerprint 2. In particular, if the contact position of the fingerprint 2 is placed on a notification list, the display device 100 can move the selection indicator to the notification list. If the contact position of the fingerprint 2 is not placed on a notification list, the display device 100 may not display the selection indicator. When no notification list is selected, the contact of the fingerprint 2 can be cancelled.

Referring to FIG. 15 (2), a home screen 12 is depicted. If a contact of a fingerprint is cancelled in a position except a notification list on the touch display unit, the display device 100 can switch a notification list selection screen to the home screen 12. In particular, the notification list selection screen is disappeared from the touch display unit and the home screen can be displayed instead. When the home screen is displayed, if the display device 100 recognizes a contact of a fingerprint again, the display device can perform a control process within the home screen according to a movement of the recognized contact. The home screen is just an example. Any predetermined screen can be a home screen instead of the notification list selection screen.

The display device 100 can be implemented in a manner that the fingerprint recognition unit 110a and the touch display unit are integrated into one body.

Figure 16:
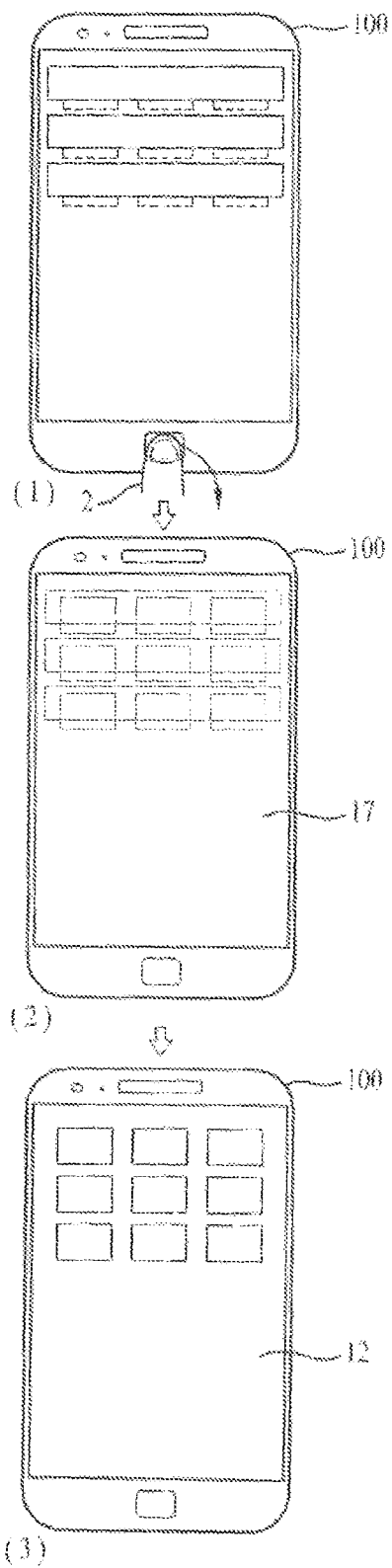
FIG. 16 is a diagram fir explaining a home screen, which is gradually switched according to one embodiment.

FIG. 16 is a diagram for explaining a home screen, which is gradually switched according to one embodiment.

FIG. 16 (1) shows a notification list selection screen. The notification list selection screen can include at least one notification list. The notification list selection screen can be displayed together with a home screen. FIG. 16 (1) shows a screen 22 in which the notification list selection screen and the home screen are displayed together. The notification list selection screen can be displayed on the home screen in a manner of being overlapped with each other. The notification list selection screen can be displayed in a manner of being activated and the home screen can be displayed in a manner of being inactivated. When no notification list is selected, a contact of a fingerprint 2 can be cancelled.

FIG. 16 (2) shows a notification list selection screen gradually switching to a home screen. If a contact of a fingerprint 2 is cancelled, the display device 100 can switch the notification list selection screen to the home screen. The display device 100 gradually inactivates the notification list selection screen and gradually activates the home screen for a predetermined time. For instance, if the predetermined time corresponds to 10 seconds, time taken for switching the notification list selection screen to the home screen corresponds to 10 seconds. The display device 100 gradually increases transparency of a layout of the notification selection screen and decreases transparency of a layout of the home screen for 10 seconds to perform a switching to the home screen. Or, the display device 100 processes the notification list selection screen with a fade-out scheme and processes the home screen with a fade-in scheme to switch a screen.

Referring to FIG. 16 (3), a home screen 12 is depicted. The display device 100 can gradually switch a notification list selection screen to a home screen. Consequently, the notification list selection screen is disappeared from the touch display unit and the home screen can be displayed instead. When the home screen is displayed, if the display device 100 recognizes a contact of a fingerprint again, the display device can perform a control process within the home screen according to a movement of the recognized contact.

Figure 17:
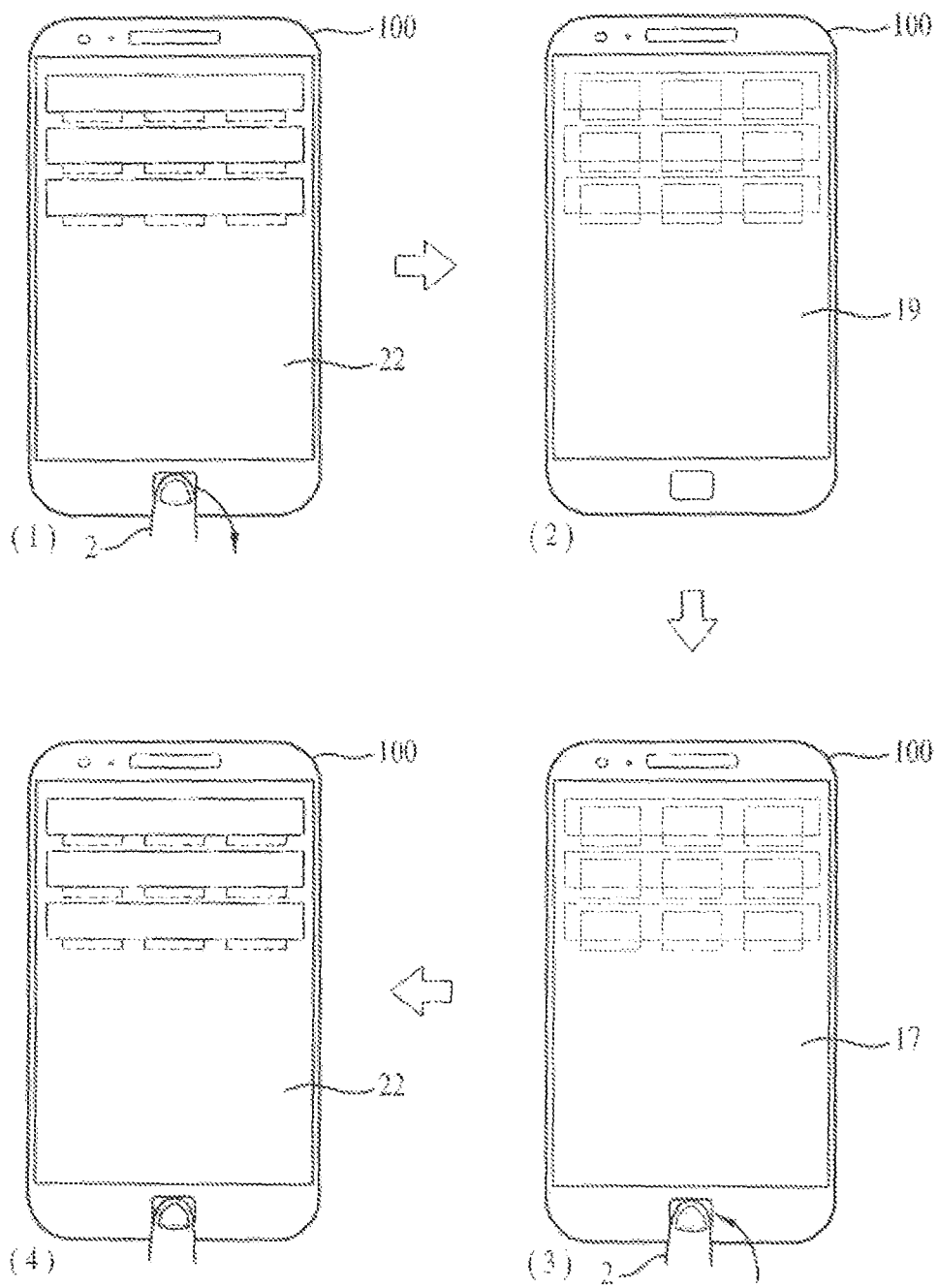
FIG. 17 is a diagram for explaining one embodiment of executing a notification list selection screen while a screen is switching.

FIG. 17 is a diagram for explaining one embodiment of executing a notification list selection screen while a screen is switching.

FIG. 17 (1) shows a notification list selection screen 22 which displayed together with a home screen. The notification list selection screen can be displayed in a manner of being activated and the home screen can be displayed in a manner of being inactivated. When no notification list is selected, a contact of a fingerprint 2 can be cancelled.

FIG. 17 (2) shows a notification list selection screen gradually switching to a home screen. If a contact of a fingerprint 2 is cancelled, the display device 100 can switch the notification list selection screen to the home screen. The display device 100 gradually inactivates the notification list selection screen and gradually activates the home screen for a predetermined time. In an early stage of switching the screen, the notification list selection screen can be more clearly displayed compared to the home screen.

FIG. 17 (3) shows the notification list selection screen 17 in which the switching of the screen has been more progressed. The display device 100 gradually increases transparency of a layout of the notification selection screen and decreases transparency of a layout of the home screen for a configured screen switching time to perform the switching to the home screen. Or, the display device 100 processes the notification list selection screen with a fade-out scheme and processes the home screen with a fade-in scheme to switch a screen.

When the switching to the home screen is not completely done, the display device 100 may recognize a contact of a fingerprint 2. If an input of the contact of the fingerprint 2 is received while the switching to the home screen is progressing, the display device 100 can display the notification list selection screen again. If a cancelled fingerprint 2 is contacted again before the switching to the home screen is completed, the display device 100 can immediately display the notification list selection screen.

FIG. 17 (4) shows the notification list selection screen 22 which is displayed together with the home screen. The display device 100 can perform a control process in the notification list selection screen 22 by recognizing a movement of the fingerprint 2 maintaining the contact or a predetermined operation. In particular, if the contact of the fingerprint is recognized via the fingerprint recognition unit before the inactivation of the notification list selection screen is completed, the display device 100 can display the notification list selection screen again.

FIG. 18 is a diagram for explaining one embodiment of executing a notification list selection screen in a home screen.

Referring to FIG. 18 (1), a home screen 12 is depicted. When the home screen is displayed, if the display device 100 recognizes a contact of a fingerprint, a control process can be performed in the home screen.

When the home screen is displayed, if a contact of a fingerprint is recognized via the fingerprint recognition unit for more than a predetermined time, the display device 100 can switch the home screen to the notification list selection screen. For instance, the predetermined time may correspond to 5 seconds. In this case, if a fingerprint is contacted with the fingerprint recognition unit for more than 5 seconds, the display device 100 can switch the home screen to the notification list selection screen.

Referring to FIG. 18 (2), a switched notification list selection screen is depicted. The notification list selection screen can display at least one notification list 21/23/25/22/24. The display device 100 can display a notification list 21/23/25, which has been displayed in a previous notification list selection screen, and a notification list 22/24 including a new notification event, which has occurred after the screen is switched from the home screen. Regarding a display order, the notification list 22/24 including the newly occurred notification event is displayed first and the previous notification list 21/23/25 can be displayed later. In particular, an updated notification list may have priority in the switched notification list selection screen.

FIG. 18 has shown an example that no notification list is checked in the previous notification list selection screen, the notification list selection screen is switched to the home screen and then the home screen is switched to the notification list selection screen again. If a schedule notification list 25 is checked in the previous notification list selection screen, the notification list selection screen is switched to the home screen and then the home screen is switched to the notification list selection screen again, the schedule notification list 25 may not be displayed in the notification list selection screen. In particular, the switched notification list selection screen can display the notification list including the newly occurred notification event and an unchecked notification list.

FIG. 19 is a diagram for explaining one embodiment of displaying summary information of a selected notification list.

Referring to FIG. 19 (1), a notification list selection screen is depicted. The notification list selection screen can display at least one notification list where an event has occurred. A selection indicator moves according to a movement of a contacted fingerprint 2 and the selection indicator can be placed on a notification list 21*a*. An SMS notification list 21*a* is selected in a manner that the selection indicator is moved.

When a selection indicator is placed on a notification list, the display device 100 can recognize that a contact of a fingerprint 2 is maintained for more than a predetermined time without any different input. For instance, the predetermined time can be configured by 1 second. If the contact of the fingerprint 2 is maintained for more than the predetermined time, the display device 100 can display summary information of the notification list 21*a* on which the selection indicator is placed.

Referring to FIG. 19 (2), a screen of displaying summary information of a notification list is depicted. As mentioned in the foregoing description, when the notification list is selected, if the contact of the fingerprint 2 is maintained for more than a predetermined time without any different input, the display device 100) can display summary information of the selected notification list. Since the selected notification list corresponds to an SMS notification list in FIG. 19 (1), the display device can display SMS summary information. In particular, if a selection indicator is placed on a notification list, the display device 100 can display summary information of the notification list.

Figure 20:
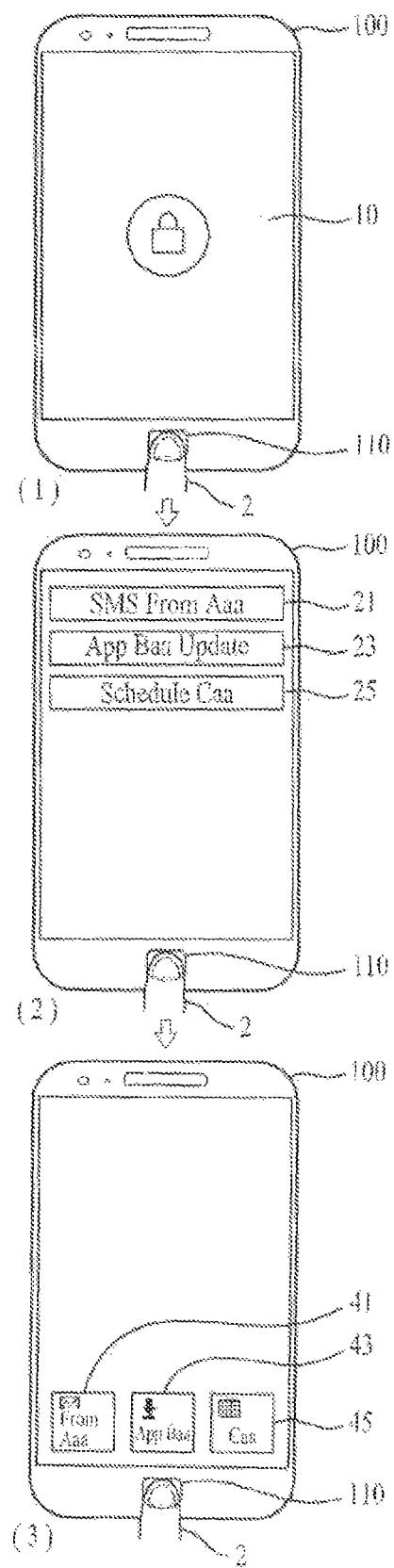
FIG. 20 is a diagram for explaining one embodiment of reconfiguring a notification list.

FIG. 20 is a diagram for explaining one embodiment of reconfiguring a notification list.

FIG. 20 (1) shows the display device 100 in which a lock screen is displayed. The display device 100 can display a screen 10 of a lock state. As depicted in FIG. 20 (1), the screen of the lock state may display an image of a lock or may display a text related to the lock state. Or, the screen of the lock state may display a general image instead of the image or the text indicating the lock state. The fingerprint recognition unit 110 receives a fingerprint 2 input of a user.

Referring to FIG. 20 (2), the display device 100 displays a notification list selection screen. When a fingerprint 2 is contacted, if a notification event is detected, the display device 100 can display the notification list selection screen. The notification list selection screen can be displayed together with a home screen in a manner of being overlapped with each other. The notification list selection screen can display notification lists 21/23/25 according to a notification event occurrence order in a manner that a recently occurred notification event is displayed first. Until the notification list selection screen is displayed from a point on which the lock state of the display device 100 is cancelled, the contact of the fingerprint 2 should be maintained.

Referring to FIG. 20 (3), the display device 100 displays a notification list selection screen in a manner of reconfiguring the notification list selection screen. The display device 100 can reconfigure notification lists included in the notification list selection screen. The reconfiguration of the notification lists can be performed in a manner of changing a size, a position, a shape and the like of the notification lists.

For instance, a first notification list selection screen can include an SMS notification list 21, an update notification list 23 and a schedule notification list 25 in an upper part of the touch display unit in a vertical orientation. Each of the notification lists 21/23/25 can include a text only. If the notification lists are reconfigured, each of the notification lists 21/23/25 can be displayed in a lower part of the touch display unit in a horizontal orientation in a manner of including an image.

The reconfiguration of the notification list selection screen can be automatically performed when a screen of the display device is displayed by the notification list selection screen.

So far, various embodiments related to the notification list selection screen have been explained. In the following, a flowchart for a method of controlling a display device is explained.

FIG. 21 is a flowchart for a method of controlling a display device according to one embodiment.

Referring to FIG. 21, if a fingerprint contacted with the fingerprint recognition unit is recognized as a registered fingerprint, a display device unlocks the display device and can switch a screen of the touch display unit to a home screen from a lock screen [S2110]. If the fingerprint contacted with the fingerprint recognition unit is recognized as the registered fingerprint, the display device unlocks the display device and can switch the screen of the touch display unit to the home screen from the lock screen.

When the fingerprint is contacted, if a notification event is detected, the display device can also display the notification list selection screen in the switched home screen [S2120]. When the fingerprint is contacted, if the notification event is detected, the display device can display the notification list selection screen on the switched home screen together. The notification list selection screen can be displayed in a manner of being activated. The home screen, which is displayed together with the notification list selection screen, can be displayed in a state of transparency in a manner of being inactivated. For instance, the transparency can be configured by a value between 0% and 100%. In some cases, the display device can display the notification list selection screen only without displaying the home screen.

The notification list selection screen can display notification lists according to a notification event occurrence order in a manner that a recently occurred notification event is displayed first. Until the notification list selection screen is displayed from a point on which the lock state of the display device is cancelled, the contact of the fingerprint should be maintained.

If a continuous movement of the fingerprint maintaining the contact is recognized, the display device can perform a control process within the notification list selection screen [S2130]. If the contact moves while the contact is maintained, the control process may correspond to moving a selection indicator according to a predetermined condition. The predetermined condition, which moves the selection indicator, may correspond to a moving direction of the fingerprint or a contact point of the fingerprint.

And, when a selection indicator is placed on a notification list, if a predetermined operation is recognized, the control process may correspond to executing an application related to the notification list. The predetermined operation may correspond to one operation selected from the group consisting of an operation of canceling a contact, an operation of putting a pressure greater than a predetermined pressure and an operation of maintaining a contact for more than a predetermined time without any different input.

A display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
   a fingerprint recognition unit configured to recognize a fingerprint and a movement of the fingerprint;
   a touch display unit configured to display visual content; and
   a controller configured to control the fingerprint recognition unit and the touch display unit,
   wherein if a fingerprint contacted with the fingerprint recognition unit is recognized as a registered fingerprint, the controller is configured to switch a screen of the touch display unit to a home screen from a lock screen by unlocking the display device,
   wherein if a notification event is detected when the fingerprint is contacted, the controller is configured to control the touch display unit to display a notification list selection screen together with the switched home screen, and wherein if a continuous movement of the fingerprint maintaining the contact is recognized, the controller is configured to perform a control process on the notification list selection screen.

2. The display device of claim 1, wherein if the contact is maintained and moves, the control process is to move a selection indicator according to a predetermined condition.

3. The display device of claim 2, wherein the controller is configured to change a moving speed of the selection indicator according to a pressure of the contacted fingerprint.

4. The display device of claim 2, wherein if a predetermined operation is recognized when the selection indicator is placed on the notification list, the control process is to execute an application related to the notification list.

5. The display device of claim 1, wherein the notification list selection screen is displayed on the home screen and is overlapped with the home screen, wherein the notification list selection screen is activated and wherein the home screen is inactivated.

6. The display device of claim 1, wherein if the contact of the fingerprint is released when a notification list is not selected, the controller is configured to control the touch display unit to make the notification list selection screen to disappear and display the home screen and wherein if a contact is recognized again, the controller is configured to perform the control process on the home screen according to a movement of the contact which is recognized again.

7. The display device of claim 6, wherein the controller is configured to gradually inactivate the notification list selection screen for a predetermined first time and configured to gradually activate the home screen for the predetermined first time.

8. The display device of claim 7, wherein if a contact of a fingerprint is recognized via the fingerprint recognition unit before inactivation of the notification list selection screen is completed, the controller is configured to control the touch display unit to display the notification list selection screen again.

9. The display device of claim 6, wherein if a contact of a fingerprint is recognized for more than a predetermined second time via the fingerprint recognition unit when the home screen is displayed, the controller is configured to control the touch display unit to switch the home screen to the notification list selection screen and wherein the switched notification list selection screen comprises an updated notification list by priority.

10. The display device of claim 2, wherein if it is determined that a center point of the fingerprint is positioned under a center point of the fingerprint recognition unit when the display device is unlocked, the controller is configured to place an initial position of the selection indicator at the undermost of an notification list and wherein if it is determined that the center point of the fingerprint is positioned above the center point of the fingerprint recognition unit when the display device is unlocked, the controller is configured to place the initial position of the selection indicator at the uppermost of the notification list.

11. The display device of claim 2, wherein the predetermined condition moving the selection indicator corresponds to a moving direction of the fingerprint or a contact position of the fingerprint.

12. The display device of claim 11, wherein when the selection indicator moves according to the moving direction of the fingerprint, the controller, if the fingerprint moves upwards on the fingerprint recognition unit, is configured to move the selection indicator to a notification list positioned at the top of the selection indicator and if the fingerprint moves downwards on the fingerprint recognition unit, is configured to move the selection indicator to a notification list positioned at the bottom of the selection indicator.

13. The display device of claim 11, wherein when the selection indicator moves according to the contact position of the fingerprint, the controller, if it is determined that a center point of the fingerprint is positioned above a center point of the fingerprint recognition unit is configured to move the selection indicator to a notification list positioned at the top of the selection indicator and if it is determined that the center point of the fingerprint is positioned under the center point of the fingerprint recognition unit is configured to move the selection indicator to a notification list positioned at the bottom of the selection indicator.

14. The display device of claim 11, wherein when the selection indicator moves according to the contact position of the fingerprint, if the fingerprint maintaining the contact moves to the touch display unit, the controller is configured to move the selection indicator to a notification list corresponding to the position of the contact on the touch display unit.

15. The display device of claim 14, wherein if the contact is released in a position which is included in remaining area except for the notification list area on the touch display unit, the controller is configured to control the touch display unit to display the home screen.

16. The display device of claim 2, wherein there exist a plurality of notification lists and wherein the controller is configured to move the selection indicator to the plurality of the notification lists sequentially.

17. The display device of claim 3, wherein the predetermined operation corresponds to at least one of an operation of releasing the contact, an operation of putting a pressure greater than a predetermined pressure and an operation of maintaining the contact for more than a predetermined third time without any different input.

18. The display device of claim 3, wherein the controller is configured to control the touch display unit to further display a home screen selection list in the notification list selection screen.

19. The display device of claim 3, wherein if the selection indicator is placed on a notification list, the controller is configured to control the touch display unit to display summary information of the notification list.

20. A method of controlling a display device, comprising the steps of:
    switching a screen of a touch display unit to a home screen from a lock screen by unlocking the display device if a fingerprint contacted with a fingerprint recognition unit is recognized as a registered fingerprint;
    displaying a notification list selection screen together with the switched home screen if a fingerprint contacted with a fingerprint recognition unit is recognized as a registered fingerprint; and
    performing a control process on the notification list selection screen if a continuous movement of the fingerprint maintaining the contact is recognized.

* * * * *